Nov. 25, 1969  I. ERLICHMAN  3,479,941
EXTENSIBLE CAMERA
Filed July 25, 1967  3 Sheets-Sheet 3
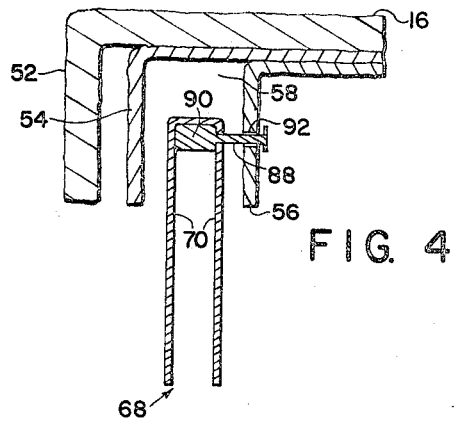
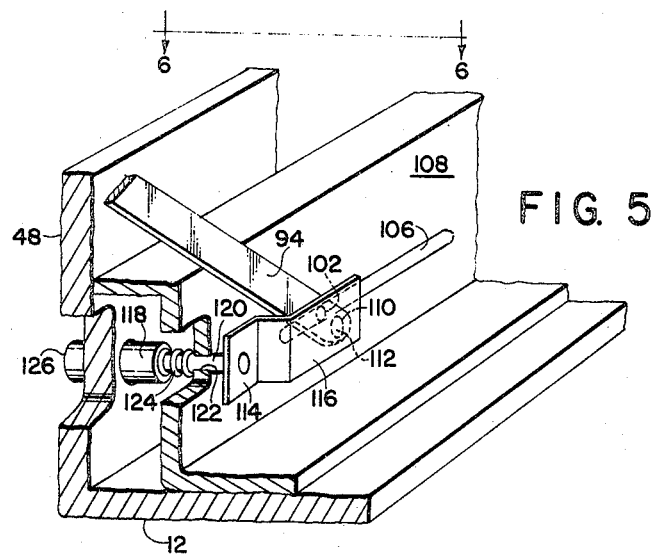
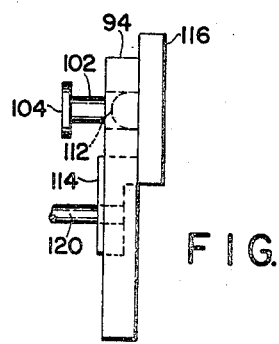
INVENTOR.
Irving Erlichman
BY  Brown and Mikulka
and
Alfred E. Corrigan
ATTORNEYS

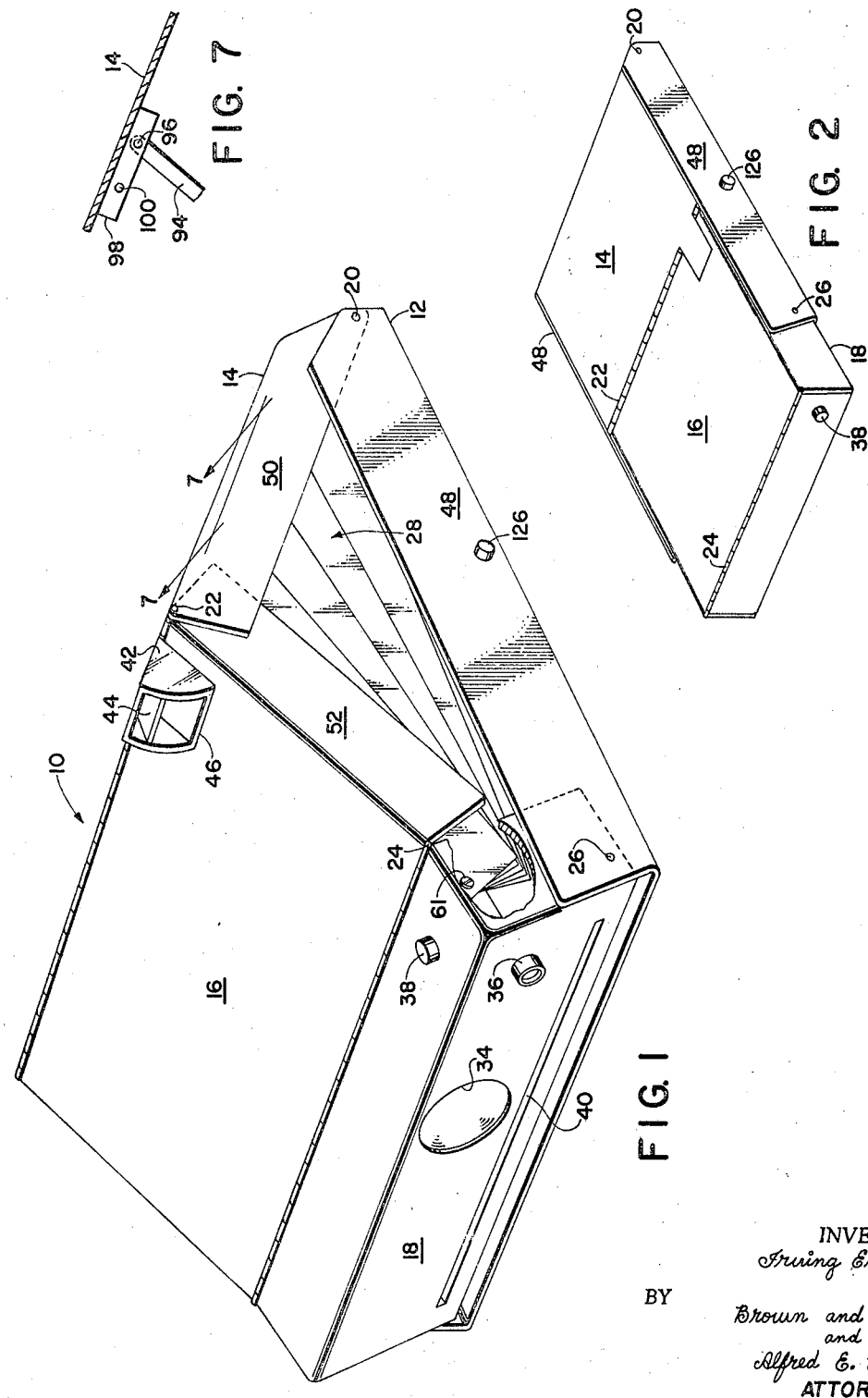

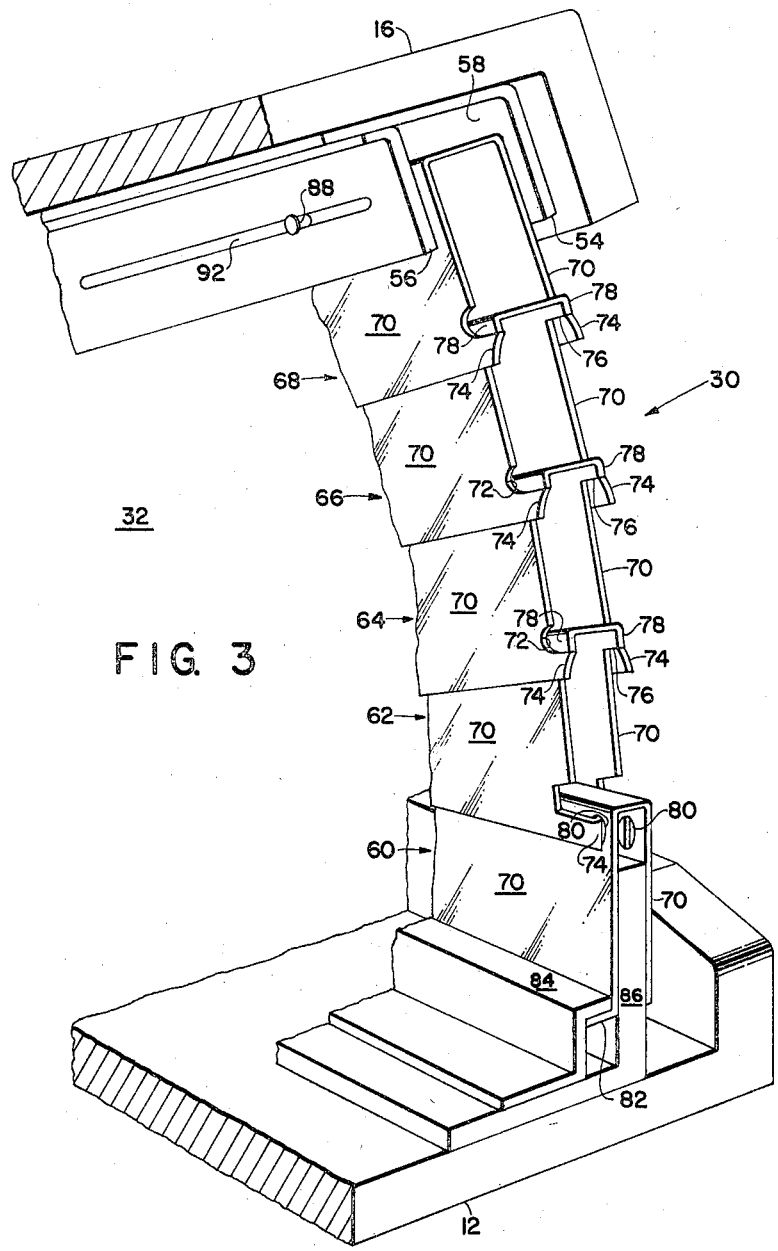

United States Patent Office 3,479,941
Patented Nov. 25, 1969

3,479,941
EXTENSIBLE CAMERA
Irving Erlichman, Natick, Mass., assignor to Polaroid Corporation, Cambridge, Mass., a corporation of Delaware
Filed July 25, 1967, Ser. No. 655,859
Int. Cl. G03b 17/04
U.S. Cl. 95—39                                      10 Claims

ABSTRACT OF THE DISCLOSURE

A folding camera comprising four relatively movable housing sections and a bellows system for joining the housing sections to form a light-tight exposure chamber, said bellows system comprising blades nesting one within another when the bellows system is in the collapsed condition, and locked together at their edges when in the expanded condition so as to form a light-impervious wall.

---

An object of the invention is to provide in a folding photographic camera comprising a multiplicity of relatively movable housing sections, a novel and improved bellows system for joining the housing sections to form a light-tight exposure chamber.

Another object of the invention is to provide a novel bellows system comprising blades adapted to nest one within another when the bellows system assumes the collapsed position and provide a light impervious wall when in an expanded position.

A further object of the invention is to provide a camera and bellows system as described provided with novel erection means including a single means for maintaining the bellows in either an extended or collapsed position.

Still another object of the invention is to provide a camera and bellows system as described including novel means allowing both rotary and linear movement of the blades of the bellows relative to its supporting structure.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a perspective view of a camera embodying the invention shown in an extended position;

FIG. 2 is a perspective view of a camera embodying the invention shown in a collapsed position;

FIG. 3 is a perspective view of one set of blades of the bellows shown in an extended position;

FIG. 4 is a cross-sectional view showing the sliding attachment of the outermost blade to part of the camera;

FIG. 5 is a perspective view looking through the rear and towards the left side of the camera showing the detent means for maintaining the camera in either a collapsed or an extended position;

FIG. 6 is a cross-sectional view taken substantially along the line 6—6 of FIG. 5; and FIG. 7 is a cross-sectional view taken substantially along the line 7—7 of FIGURE 1.

Reference is now made to FIGURE 1 of the drawings wherein is illustrated photographic apparatus in the form of an extensible type camera 10 embodying the instant invention, said camera being shown in its operative or extended position. The camera comprises means for exposing and processing self-contained film units. The structure for accomplishing the above is described in copending U.S. patent application of Land et al., Ser. No. 655,850 filed on even date herewith.

As shown in FIGURE 1, camera 10 has a substantially hexahedron configuration the six sides including a housing having four housing sections designated 12, 14, 16 and 18, pivotally attached to each other by hinge means 20, 22, 24 and 26, and bellows 28 and 30. Housing sections 12, 14, and 16 include, as integral parts thereof, flange members 48, 50, and 52, respectively, at each end thereof for partially overlapping bellows 28, 30, said flange members being at a 90° angle to the housing walls from which they are dependent. Flange members 48 provide a bearing surface for hinge means 20, 26, flange members 50 for hinge means 20, 22, and flange members 52 for hinge means 22 and 24. The aforementioned four housing sections and two bellows cooperate to form a substantially light free exposure chamber 32 therebetween. A conventional lens and shutter assembly 34, the latter being of the automatic type including a photoelectric cell 36 and shutter actuation button 38, are provided for forming an image at a film unit positioned for exposure within the camera housing and admitting a predetermined amount of light to enter chamber 32 to expose a film unit located therein. The exposed film unit subsequently is processed and delivered via slot 40 to the user of the camera by a mechanism such as described in the aforementioned Land et al. application. A view finder is incorporated in housing section 14 and includes an end portion 42 enclosing a mirror 44 and provided as an extension of housing section 14. Housing section 16 is provided with a cut out portion 46 to allow passage of portion 42 therethrough as said camera is moved to its inoperative or collapsed position shown in FIG. 2.

The structure for enabling the camera 10 to move between a collapsed position as shown in FIG. 2, and an extended or operative position is most clearly shown in FIG. 3 which is a perspective view as seen looking through the rear of the camera at the right-hand bellows 30. Bellows 28 and 30 are of similar construction and therefore only bellows 30 will be described. Housing section 16 has a pair of L-shaped flange means 54, 56 attached thereto by any suitable means. Flange means 54, 56 define a channel 58 in which is nested the outermost blade 68, one of a plurality of blades 60, 62, 64, 66 and 68 which comprise a bellows 30. The blades 60, 62, 64, 66 and 68 are of a generally U-shaped configuration when viewed in cross section and may be formed of sheet metal or other suitable sheet material having similar physical properties. The distance between the legs 70 of outermost blade 68 is greater than that of the intermediate blade 66; the distance between the legs 70 of intermediate blade 66 is greater than that of intermediate blade 64 and so on down to the innermost blade 60. As will be apparent from viewing FIG. 3, the blades 60, 62, 64, 66 and 68, which are connected together at their converging ends by suitable pivot means, such as a rivet 61, will nest one within the other when bellows 30 is in a collapsed position. As shown rivet 61 pivotally connects bellows 30 with housing section 18.

Intermediate blades 62, 64 and 66 are of substantially similar configuration with each blade having a cut out portion 72 in each leg 70 thereof. Adjacent cut out portions 72 or a pair of protruding members 74 which are bent inwardly such that the distance between each pair of members 74 is less than the thickness of the next lower blade. At the bight of the U of each intermediate blade there are provided cut out portions 76 which define protruding members 78. The distance between members 78 on each blade is greater than the corresponding distance between members 74 of the blade immediately above it.

For example the distance between members 78 of intermediate blade 64 is greater than the distance between members 74 of blade 70. Outermost blade 68 is similarly provided with cut out portions 72 and protruding members 74. Innermost blade 60 is provided with apertures 80 in each of its legs 70 for receiving protruding members 74. Accordingly, it can be seen that as the blades are moved to an extended position protruding members 74 of blade 68 will move into abutting relation with protruding members 78 of blade 66. It will be noted that the distance between the legs 70 of blade 66 is greater than the distance between protruding members 74; therefore as blade 68 is rotated about its pivot point protruding members 74 are forced apart by legs 70 of blade 66 until members 74 clear the side edges of legs 70. At this time the resiliency of the protruding members allows members 74 to return to the position in which they will come into abutting relation with members 78. When members 74 and 78 abut further rotary movement will bring protruding members 74 of blade 66 into contact with protruding members 78 of blade 64. This action continues until protruding members 74 of blade 62 partially enter apertures 80. An abutment means 82 is provided on the inner leg 70 of blade 60 for cooperating with a flange member 84 mounted on a support 86. Support 86 is mounted on member 12 by any suitable means. The cooperation between abutment means 82 and flange member 84 is such that the rotary movement of innermost blade 60 is limited while at the same time allowing linear movement of blade 60 relative to flange member 84, as will be more fully explained hereinafter.

The inner wall 70 of outermost blade 68 is provided with a coupling means in the form of a rod 88 passing through an aperture in leg 70 having an enlarged portion 90 attached to the interior wall of leg 70 as shown in FIG. 4. Rod 88 is operatively coupled with flange member 56 via slot 92 for preventing rotary movement of blade 68 relative to flange member 56 while simultaneously allowing relative linear movement between the two. Because rod 88 only passes through the inner leg 70 the light seal provided by the outer leg 70 is maintained.

Referring again to FIGURE 1 it will be noted that housing section 18 pivots in a counterclockwise manner about pivot or hinge 26 as the camera is moved to its collapsed position. The converging or front ends of bellows 28 and 30 are pivotally connected at 61 to housing section 18 such that counterclockwise rotation of housing section 18 will cause bellows 28, 30 to move to the left while simultaneously causing blades 60, 62, 64, 66 and 68 to assume a nested position. During this combination of rotary and linear movement of the front of bellows 28, 30 to the left, as viewed in FIGURE 1, flange member 84 limits the rotary motion of the ends of the blades by restraining blade 60 to substantially linear movement. Also, as the bellows 28, 30 start to move to the left, the collapsing of the blades into their nested position causes rod 88 to exert a downward force on housing section 16 to pivot it about hinge 24 in a clockwise manner. Housing section 16 causes housing section 14 to rotate in a counterclockwise manner about pivot 20 as it rotates clockwise about pivot 24 while simultaneously moving to the left until the camera assumes the position shown in FIG. 2.

The camera is also provided with an erection system for moving the camera between its collapsed and extended positions. Referring to FIGS. 5-7 there is provided a link 94 interconnecting housing section 12 with housing section 14. The top end of link 94 is pivotally attached at 96 to a flange 98 connected to housing section 14. Flange 98 is also provided with an aperture 100 whose function will be explained hereinafter. The lower end of link 94 is provided with a coupling means in the form of a rod 102 having an enlarged end portion 104 for maintaining rod 102 within slot 106 in member 108. The lower end of link 94 is also provided with an aperture 110, shown in dotted lines in FIG. 5. As is obvious from viewing FIG. 5, link 94 can simultaneously rotate about the axis of rod 102 and linearly move to the right as the camera moves toward its collapsed position.

In order to maintain the camera in either the collapsed or extend positions there is provided a detent means 112 integrally connected to a resilient plate 114 having an offset portion 116 which extends inwardly in order to clear the lower end of link 94. Attached to plate 114 is a rod 118 having a portion 120 of a reduced diameter passing through an aperture 122 in flange member 108. Portion 120 is provided with suitable biasing means such as spring 124 for urging rod 118 to the left as viewed in FIG. 5. Rod 118 is provided with a button 126 as it emerges from the camera body. In the position shown in FIGS. 5-7, link 94 is in its fully extended position and detent means 112 has entered the aperture 110 in link 94 to lock link 94 against any movement. When it is desired to fold the camera, i.e., move the camera to its collapsed position the button 126 is depressed moving elements 118, 120, 114, 116 and detent means 112 to the right against the force of spring 124 to remove detent means 112 from aperture 110 thereby freeing the bottom end of link 94 for rotary and linear movement. As the camera assumes the folded position housing section 14, carrying with it flange 98, rotates counterclockwise about hinge 20 until the camera is in the folded position. At this time aperture 100 in flange 98 is in alignment with the axis of detent means 112 and consequently detent means 112 is in locking engagement with flange 98. This alignment takes places because detent means 112 and aperture 100 are equidistantly spaced from hinge 20. Again, should the operator of the camera wish to move the camera to its operative or extended position he merely presses button 126 to remove detent means 112 from aperture 100 thereby freeing housing section 14 for clockwise movement about hinge 20 under the influence of suitable means such as springs (not shown).

From the foregoing it is apparent that a novel camera has been disclosed. By utilizing blades which have a generally U-shaped configuration two light barriers, i.e., each leg of the U, are available for maintaining the chamber containing the film unit substantially free from light in both the collapsed and extended positions of the camera housing and during collapsing and extending motion thereof. Also, the spacing between certain elements have been exaggerated in the drawings in order to improve the clarity of the disclosure. Needless to say suitable means are provided for preventing the leakage of light into the camera. Further, although hinges 22, 24 are shown as being mounted exteriorly of the camera it should be obvious that they could be mounted interiorly of the camera to enhance the beauty of the camera.

Since certain charges may be made in the above apparatus without departing from the scope of the invention herein involved, it is intended that all matter contained in the above description or shown in the accompanying drawings shall be interpreted as illustrative and not in a limiting sense.

What is claimed is:

1. An expansible bellows for a camera movable between a collapsed and an extended position comprising:
   a plurality of sets of blades, each set comprising a plurality of blades pivotally attached to each other at one end thereof including at least one intermediate blade, an outermost blade and an innermost blade, said blades having a generally U-shaped configuration in cross section with the distance between the legs of the U of said intermediate blade being greater than that of said innermost blade and less than that of said outermost blade for allowing said blades to nest one within the other when said bellows is in said collapsed position;
   interlocking means associated with each said blade and being engaged by the interlocking means on an adjacent blade as said bellows is moved towards said extended position; and a plurality of pivotally connected housing sections for substantially covering the extremities of said blades.

2. An expansible bellows as defined in claim 1 including flange means coupled to one of said housing sections and one of said legs of said innermost blade includes abutment means cooperating with said flange means for limiting the rotary motion of said innermost blade and for permitting linear motion of said innermost blade relative to said flange means.

3. An expansible bellows as defined in claim 2 including guide means attached to one of said housing sections, coupling means attached to said outermost blade and cooperating with said guide means for permitting linear movement of said outermost blade relative to said guide means.

4. An expansible bellows as defined in claim 1 including erecting means for moving said bellows between said collapsed position and said extended position, said erecting means comprising link means pivotally attached at one end to one of said housing sections and having means at the other end thereof for coupling said other end to another of said housing sections for rotary and sliding movement as said link means moves said bellows between the extended and collapsed positions and detent means mounted on said other housing section and engagable with said other end of said link means for maintaining said bellows in the extended position.

5. An expansible bellows as defined in claim 4, wherein said one housing section includes second aperture means for receiving said detent means when said bellows is in said collapsed position.

6. Expansible photographic apparatus having a substantially hexahedron configuration when in an extended position comprising, in combination:

four housing sections pivotally interconnected for movement toward and away from one another between collapsed and extended positions;

two bellows operatively coupled with said housing sections and cooperating therewith to define a substantially light free exposure chamber;

said bellows each comprising a plurality of telescoping, nesting blades having generally U-shaped cross sections pivotally attached to each other at one end thereof and including at least one intermediate blade, an outermost blade attached to one housing section and an innermost blade attached to another housing section; and interlocking means associated with each blade and being engaged by said interlocking means on an adjacent blade as said housing sections are moved apart from one another into an extended poistion.

7. Expansible photographic apparatus as defined in claim 6 including means for coupling said innermost blade to one of said housing sections for limiting the rotary motion of said innermost blade and for permitting linear motion of said innermost blade relative to said housing section.

8. Expansible photographic apparatus as defined in claim 7 including guide means attached to one of said housing sections, coupling means attached to said outermost blade and cooperating with said guide means for permitting linear movement of said outermost blade relative to said guide means.

9. Expansible photographic apparatus as defined in claim 6 including erecting means for moving said bellows between said collapsed position and said extended position, said erecting means comprising link means pivotally attached at one end to one of said housing sections and having means at the other end thereof for coupling said other end to another of said housing sections for rotary and sliding movement as said link means moves said bellows between the extended and collapsed positions and detent means mounted on said other housing section and engagable with said other end of said link means for maintaining said bellows in the extended position.

10. Expansible photographic apparatus as defined in claim 9 wherein said one housing section includes second aperture means for receiving said detent means when said bellows is in said collapsed position.

References Cited

UNITED STATES PATENTS 1,642,651   9/1927   Gaebel _____ 95—39

JOHN M. HORAN, Primary Examiner